(12) United States Patent
Rorke

(10) Patent No.: US 6,729,290 B1
(45) Date of Patent: May 4, 2004

(54) INTERNAL COMBUSTION ENGINE

(75) Inventor: David James Rorke, Kelmscott (AU)

(73) Assignee: Aardvark Pty. Ltd., Henderson (AU)

( * ) Notice: Subject to any disclaimer, the term of this patent is extended or adjusted under 35 U.S.C. 154(b) by 0 days.

(21) Appl. No.: 10/018,374

(22) PCT Filed: Jun. 14, 2000

(86) PCT No.: PCT/AU00/00663

§ 371 (c)(1),
(2), (4) Date: Apr. 18, 2002

(87) PCT Pub. No.: WO00/77357

PCT Pub. Date: Dec. 21, 2000

(30) Foreign Application Priority Data

Jun. 14, 1999 (AU) ................................................ PQ0921

(51) Int. Cl.[7] .............................................. F02B 23/06
(52) U.S. Cl. ................. 123/193.6; 123/56.3; 123/73 AV
(58) Field of Search ............................... 123/56.3, 56.4, 123/73 AV, 279, 276, 262, 290, 301, 193.6

(56) References Cited

U.S. PATENT DOCUMENTS

| 4,738,236 A | * | 4/1988 | Kawamura ................... 123/276 |
| 5,007,394 A | * | 4/1991 | Brychta et al. ............. 123/279 |
| 5,261,358 A |   | 11/1993 | Rorke |
| 5,479,888 A | * | 1/1996 | Morimoto et al. .......... 123/262 |
| 6,178,942 B1 | * | 1/2001 | di Priolo et al. ............ 123/273 |

FOREIGN PATENT DOCUMENTS

| GB | 140 598 | 4/1920 |
| GB | 2 019 936 | 11/1979 |

OTHER PUBLICATIONS

Derwent Abstract Accession No. 99–32489/27, Nissan Motor Co., Ltd. "Fuel Collection Mechanism in Piston for Fuel Injection Type Internal Combustion Engine"; JP 11–117749A.

Derwent Abstract Accession No. 88–048546/07, Tolyatti Poly. "Internal Combustion Engine Combustion Changer"; SU 1321–868A.

* cited by examiner

*Primary Examiner*—Marguerite McMahon
(74) *Attorney, Agent, or Firm*—Merchant & Gould P.C.

(57) ABSTRACT

A piston (17) for an internal combustion engine. The piston (17) has a piston head (43) and a recess (46) formed in the piston head. A formation (91) is associated with the recess (46) for generating a turbulent motion in a fluid introduced into the recess. The formation (91) is configured to generate a swirling turbulent motion to the fluid introduced into the recess and preferably comprises spiral grooves (93) formed in the piston.

24 Claims, 11 Drawing Sheets

USCombustion Engine

INTERNAL COMBUSTION ENGINE

FIELD OF THE INVENTION

This invention relates to an internal combustion engine. More particularly, the invention relates to a piston for a reciprocating internal combustion engine. The invention also relates to a control system for a valve incorporated in a piston for an internal combustion engine

BACKGROUND ART

The invention has been devised particularly, although not exclusively, for an internal combustion engine of the type disclosed in U.S. Pat. No. 5,261,358, the contents of which are incorporated herein by way of reference.

With the abovementioned internal combustion engine, as also is the case with most reciprocating piston internal combustion engines, it is particularly desirable for fuel droplets to mix intimately with air in the combustion chamber. One way in which this can be achieved is by subjecting the air in the combustion chamber to a swirling motion.

With the abovementioned internal combustion engine, it is also desirable for scavenging air introduced into the combustion chamber to undergo turbulent flow in order to perform an effective scavenging process.

Furthermore, in the abovementioned engine, the scavenging air is introduced into the combustion chamber through a port in the piston which is opened and closed by a valve. There is a need for a simple yet effective system for controlling operation of the valve.

It is against this background that the present invention has been developed.

DISCLOSURE OF THE INVENTION

According to one aspect of the present invention there is provided a piston for an internal combustion engine, the piston comprising a piston head, a recess formed in the piston head, and a formation associated with the recess for generating a turbulent motion in a fluid introduced into the recess.

Preferably, the formation is configured to generate a swirling turbulent motion to the fluid introduced into the recess.

The formation may comprise at least one spiral groove formed in the piston. Preferably, there are a plurality of the spiral grooves disposed about the recess. Conveniently, each of the spiral grooves extends outwardly from the recess and tapers inwardly in the direction in which it spirals outwardly.

With this arrangement, combustion air contained in the combustion chamber is acted upon by the formation associated with the recess as the piston performs a compression stroke, thereby causing the combustion air to undergo a turbulent motion which promotes mixing between the air and fuel droplets delivered into the combustion chamber.

In the case of an engine in which scavenging air is introduced into the combustion chamber through a port in the head of the piston (as is the case with the abovementioned engine disclosed in U.S. Pat. No. 5,261,358), the formation may be arranged to impart a swirling motion to the scavenging air entering the combustion chamber and so assist the scavenging process.

With this arrangement, the port through which the scavenging air is introduced into the combustion chamber may open into the recess such that the incoming scavenging air is subjected to the influence of the formation.

The port may be opened and closed by a valve which is operable under the influence of a control system.

The control system may include a hydraulic lifter operable by a hydraulic fluid such as oil (which may, for example, be oil used for lubricating the engine). The control system may further include a fluid flow path along which hydraulic fluid is delivered to the hydraulic lifter, the fluid flow path including a first section and a second section. The second section is located in the piston and opens onto a side wall thereof. The first section is located in part of the engine with respect to which the piston can reciprocate, and opens onto a side wall of the cylinder in which the piston is housed. With this arrangement, the second section registers with the first section for a limited period during reciprocation of the piston. When the piston is performing an expansion stroke and there is registration between the two sections of the fluid flow path, hydraulic fluid flows from the first section to the second section thereby to cause operation of the valve lifter.

A bleed path may be associated with the second section to allow hydraulic fluid to bleed therefrom.

The control system may further include a spring means for biasing the valve to a closed condition in relation to the port. Once the two sections of the fluid flow path have moved out of registration, the influence of the spring means causes the valve to return to the closed condition, with hydraulic pressure on the valve lifter being relieved by fluid bleeding from the second section.

According to a second aspect of the invention, there is provided an internal combustion engine having a piston according to the first aspect of the invention.

According to a third aspect of the invention there is provided a piston for an internal combustion engine, the piston comprising: a port formed in the head thereof through which a fluid can be delivered into a combustion chamber; a valve for opening and closing the port; and a formation in the piston head for imparting a swirling motion to fluid delivered into the combustion chamber through the port upon opening thereof.

Preferably, the port is accommodated in a recess formed in the piston, the formation comprising a plurality of spiral grooves formed in the piston about the recess.

The valve for opening and closing the port of the piston according to the third aspect of the invention may be operable under the influence of a control system as defined hereinbefore.

According to a fourth aspect of the invention, there is provided an internal combustion engine having a piston according to the third aspect of the invention.

According to a fifth aspect of the invention there is provided a piston for an internal combustion engine, the piston comprising: a port formed in the head thereof through which a fluid can be delivered into a combustion chamber; a valve for opening and closing the port; and a control system for operating the valve, the control system including a hydraulic lifter operable by a hydraulic fluid such as oil (which may, for example, be oil used for lubricating the engine), the control system further including a fluid flow path along which hydraulic fluid is delivered to the hydraulic lifter, the fluid flow path having a first section and a second section, the second section being located in the piston and opening onto a side wall thereof, and the first section being located in part of the engine with respect to which the piston can reciprocate and opening onto a side wall of the cylinder in which the piston is housed, whereby the second section can register with the first section for a limited period during reciprocation of the piston such that when the piston is performing a prescribed stroke and there is registration between the two sections of the fluid flow path, hydraulic fluid can flow from the first section to the second section thereby to cause operation of the valve lifter.

According to sixth aspect of the invention, there is provided an internal combustion engine having a piston according to the fifth aspect of the invention.

BRIEF DESCRIPTION OF THE DRAWINGS

The invention will be better understood by reference to the following description of one specific embodiment thereof, as shown in the accompanying drawings in which.

BEST MODE(S) FOR CARRYING OUT THE INVENTION

Figure 1:
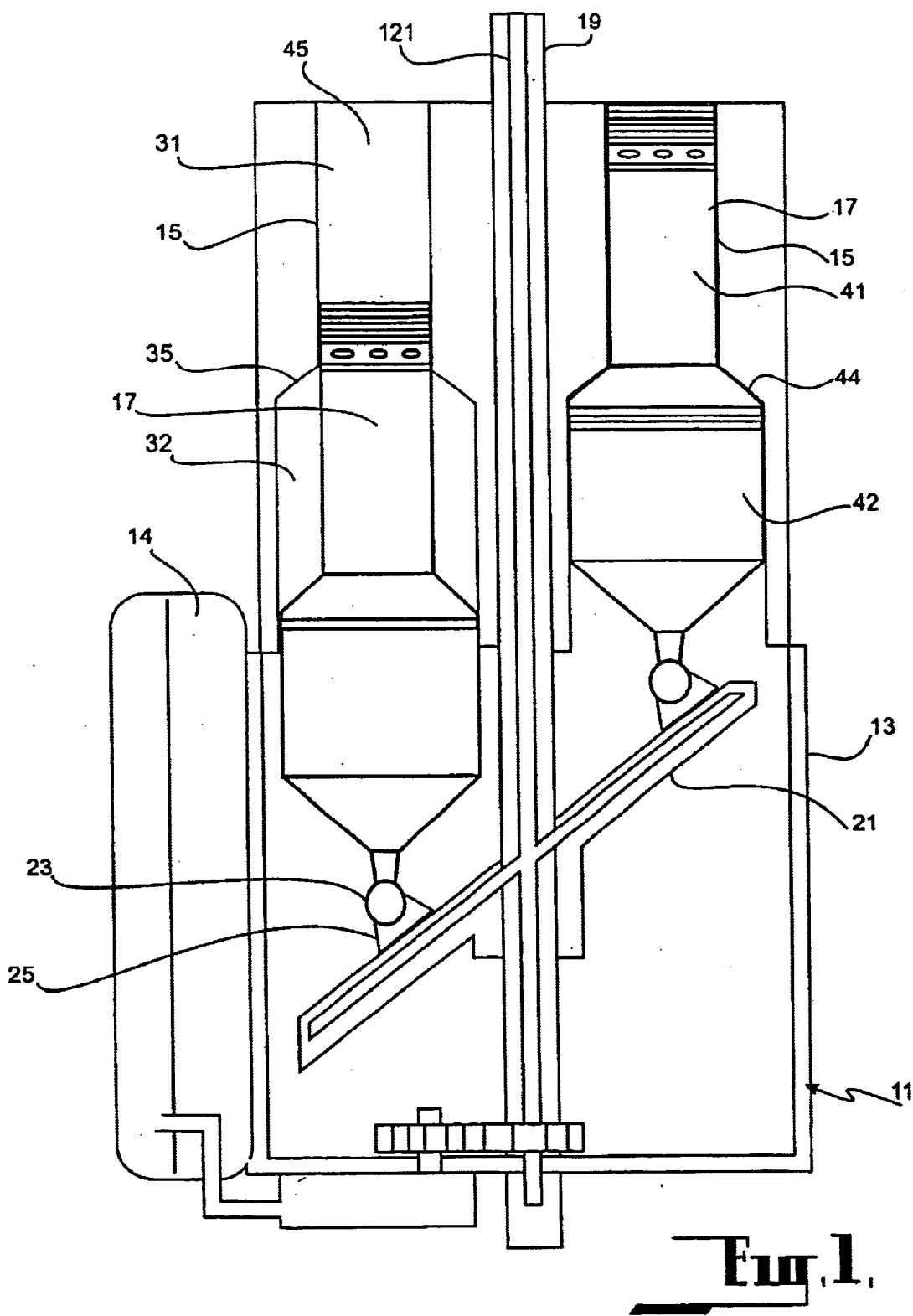
FIG. 1 is a schematic sectional view of an engine according to the embodiment.
Figure 2:
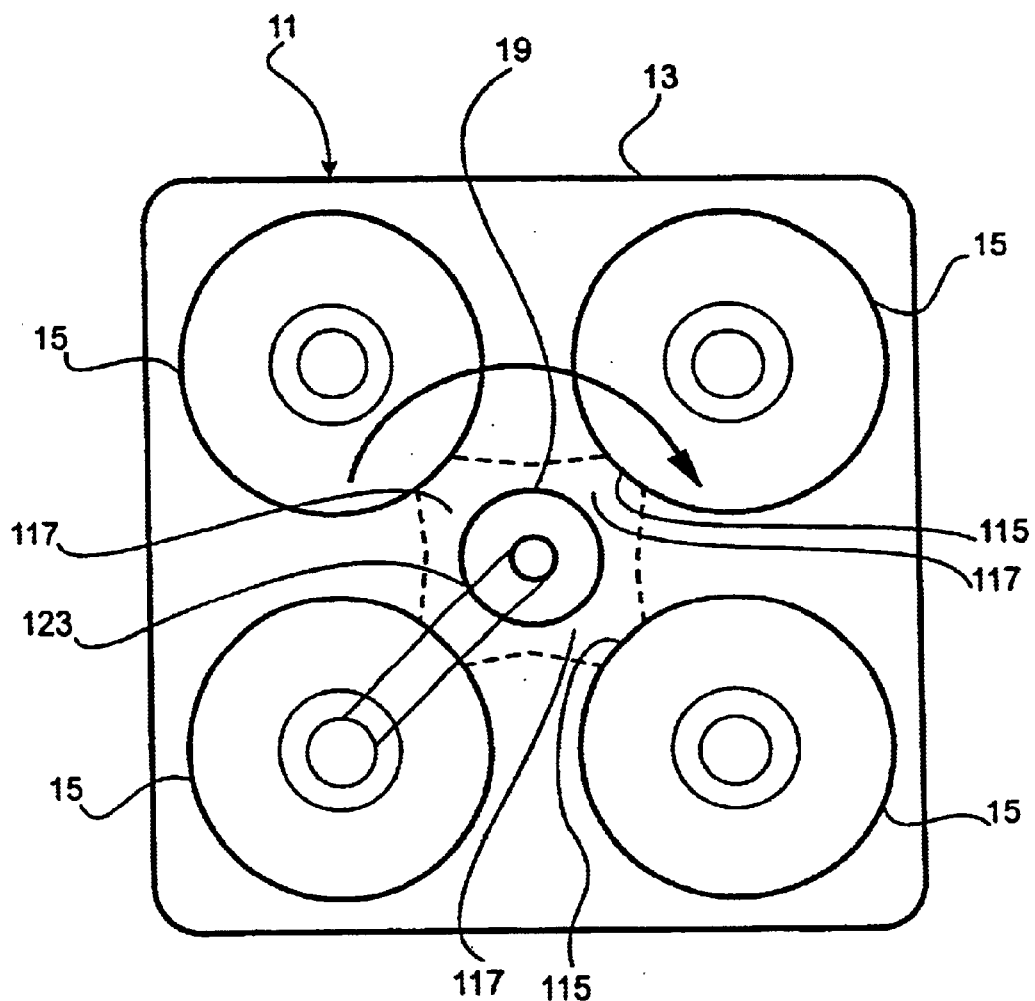
FIG. 2 is an end view of the engine of FIG. 1.

The embodiment is directed to an internal combustion engine which operates in a similar fashion to the engine disclosed in U.S. Pat. No. 5,261,352, the contents of which are incorporated herein by way of reference.

The internal combustion engine comprises a housing 11 having a block 13 and an oil sump 14. A plurality of cylinders 15 are defined within the housing, there being four such cylinders in this embodiment. Each cylinder 15 has a piston 17 reciprocating within it. Each piston 17 is operatively connected to a drive shaft 19 by way of a swash plate 21. The piston 17 has a foot 23 received in a shoe 25 slidably supported on the swash plate.

Each cylinder 15 is of stepped configuration so as to comprise two portions, being a cylinder working portion 31 and a cylinder pumping portion 32. The cylinder pumping portion 32 is of larger cross-sectional area than the cylinder working portion 31, as shown in the drawings. The cylinder working portion 31 has a wall 33 at one of its ends, and the two cylinder portions open onto each other at the other end of the cylinder working portion. A transition wall 35 connects the two cylinder portions 31, 32 together at the location where they open onto each other. The transition wall 35 provides the step in the cylinder 15.

The piston 17 is also of stepped configuration so as to comprise two portions, being a piston working portion 41 and a piston pumping portion 42. The piston working portion 41 is received within the cylinder working portion 31, and the piston pumping portion 42 is received within the cylinder pumping portion 32. A transition portion 44 is provided between the piston working portion 41 and the piston pumping portion 42.

A combustion chamber 45 is defined by co-operation between the piston working portion 41 and the cylinder working portion 31.

The piston 17 has a head end 43 which confronts the combustion chamber 45 and in which there is provided a recess 46 (the purpose of which will be explained later).

An annular pumping chamber 47 is defined between the cylinder pumping portion 32, the cylinder transition wall 35 and the piston 17.

The combustion chamber 45 and the pumping chamber 47 vary in volume as the piston 17 undergoes reciprocation in the cylinder 15.

An inlet means 51 is provided to admit air into the pumping chamber 47 as it undergoes an expansion in volume. The inlet means 51 includes a plurality of air inlet ports 53 which are provided in the cylinder transition wall 35 and which open onto the annular pumping chamber 47. A valve (not shown) is associated with each inlet port 53 and is operable to permit air to flow through the port into the pumping chamber 47 upon expansion of the pumping chamber while preventing return flow out of the port 53 upon volume reduction of the pumping chamber.

A transfer system 61 is provided for selectively transferring air from the pumping chamber 47 to the combustion chamber 45. The transfer system 61 comprises a transfer chamber 63 within the piston 17 to receive air under pressure from the pumping chamber 47 as the latter undergoes a reduction in volume and to contain such air. The transfer chamber 63 receives air from the pumping chamber 47 by way of a plurality of transfer ports 65 provided in the transition portion 44 of the piston 17. Each transfer port 65 opens onto the transfer chamber 63. A one-way transfer valve 67 is provided in association with each transfer port 65 and is operable to permit air to flow through the transfer port 65 into the transfer chamber 63 upon volume reduction of the pumping chamber 47, while preventing return flow upon volume expansion of the pumping chamber.

A valve system 71 is provided for controlling discharge of air from the transfer chamber 63 to the combustion chamber 45. The valve system 71 comprises a port 73 in the piston head 43, the port being located at the base of the recess 46 and opening onto the recess. The valve system 71 further comprises a discharge valve 75 for opening and closing the discharge port 73.

The discharge valve 75 opens and closes under the control of a hydraulic control system 77 which will be explained in more detail later. A spring means 79 is provided for biasing the discharge valve 75 into the position in which it closes the discharge port 73.

Air introduced into the combustion chamber 45 from the pumping chamber 47 serves a scavenging function and may also be used for combustion purposes. A combustible mixture which is introduced into the combustion chamber 45. A delivery system (not shown) including an inlet port which is opened and closed in timed sequence by a valve may be provided for delivery of combustion air into the combustion chamber, to supplement air delivered by way of the transfer system 61. A fuel injection system (not shown) may be provided for injecting fuel into the air to provide the combustible mixture. An exhaust system 81 is provided for discharging products of combustion from the combustion chamber 45. The exhaust system 81 includes an exhaust port 83 which is opened and closed in timed sequence by an exhaust valve 85.

Figure 3:
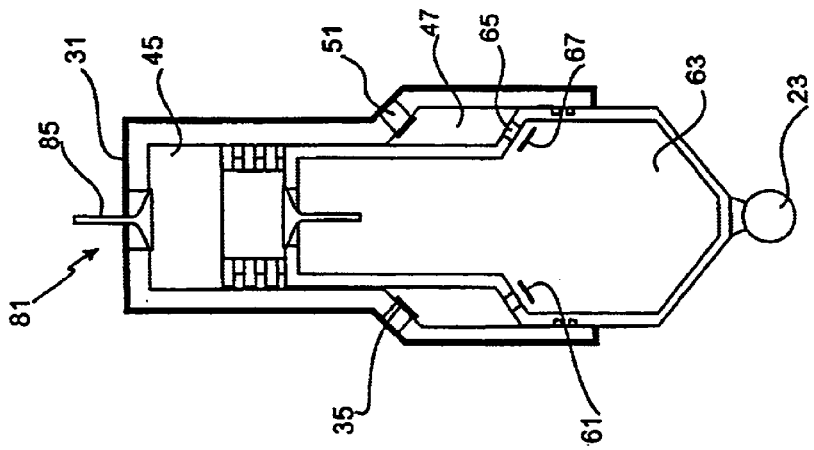
FIG. 3 is a schematic view of one cylinder of the engine shown in a condition in which it is undergoing a power stroke.
Figure 4:
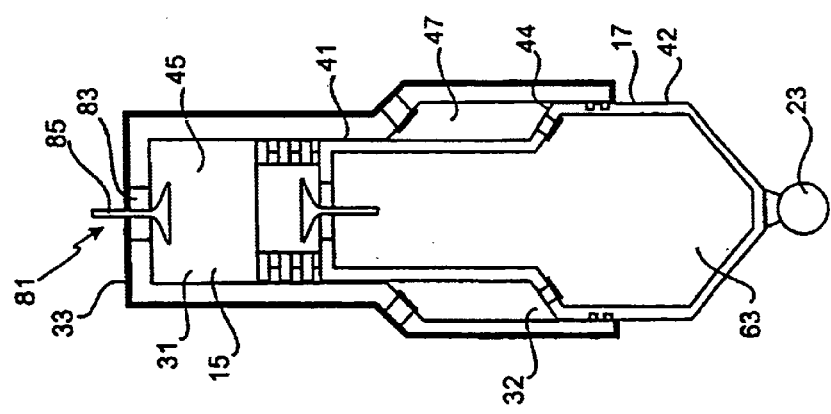
FIG. 4 is a view similar to FIG. 3 except that the cylinder is shown in an undergoing scavenging.
Figure 5:
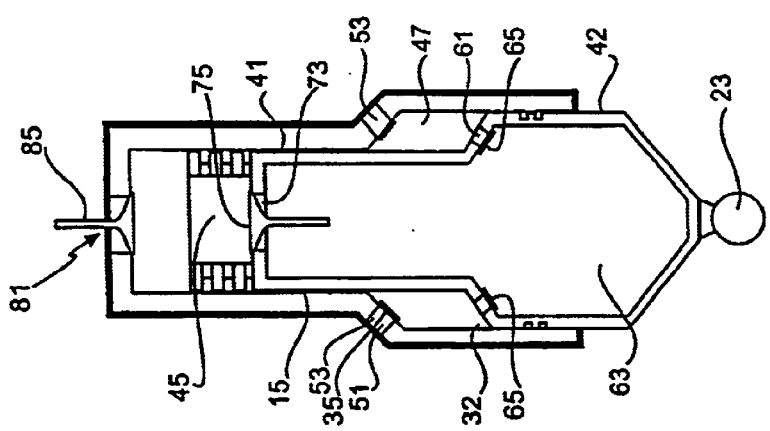
FIG. 5 is also a view similar to FIG. 3 with the exception that the cylinder is shown undergoing a compression stroke.
Figure 6:
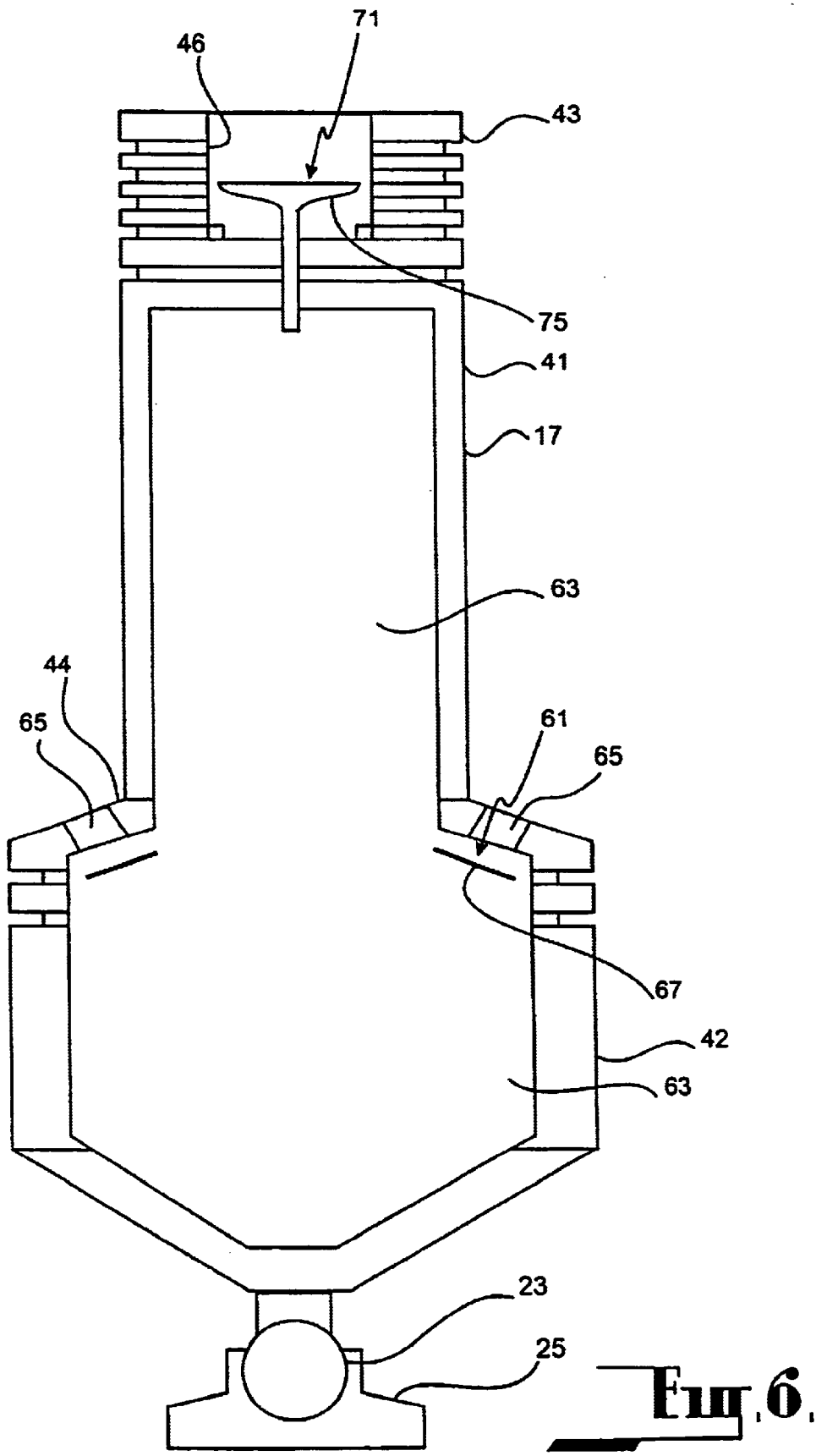
FIG. 6 is a schematic view of one of the pistons used in the engine.

The engine operates in a similar fashion to the engine disclosed in U.S. Pat. No. 5,261,358 and so will not be described in detail. The operation is, however, schematically illustrated in FIGS. 3, 4 and 5 of the drawings. In FIG. 3 of the drawings, the piston 17 is shown performing a power stroke, with the result that the pumping chamber 47 undergoes expansion to draw in air through inlet ports 53. As illustrated in FIG. 4, towards the end of the power stroke, the discharge valve 75 and the exhaust valve 85 both open. This allows air under pressure within the transfer chamber 63 to flow into the combustion chamber 45 and perform a scavenging process. FIG. 5 illustrates the subsequent compression stroke where a combustible mixture in the combustion chamber 45 is compressed, and the volume reduction of the pumping chamber 47 causes air contained therein to flow through the ports 65 into the transfer chamber 63.

Figure 7:
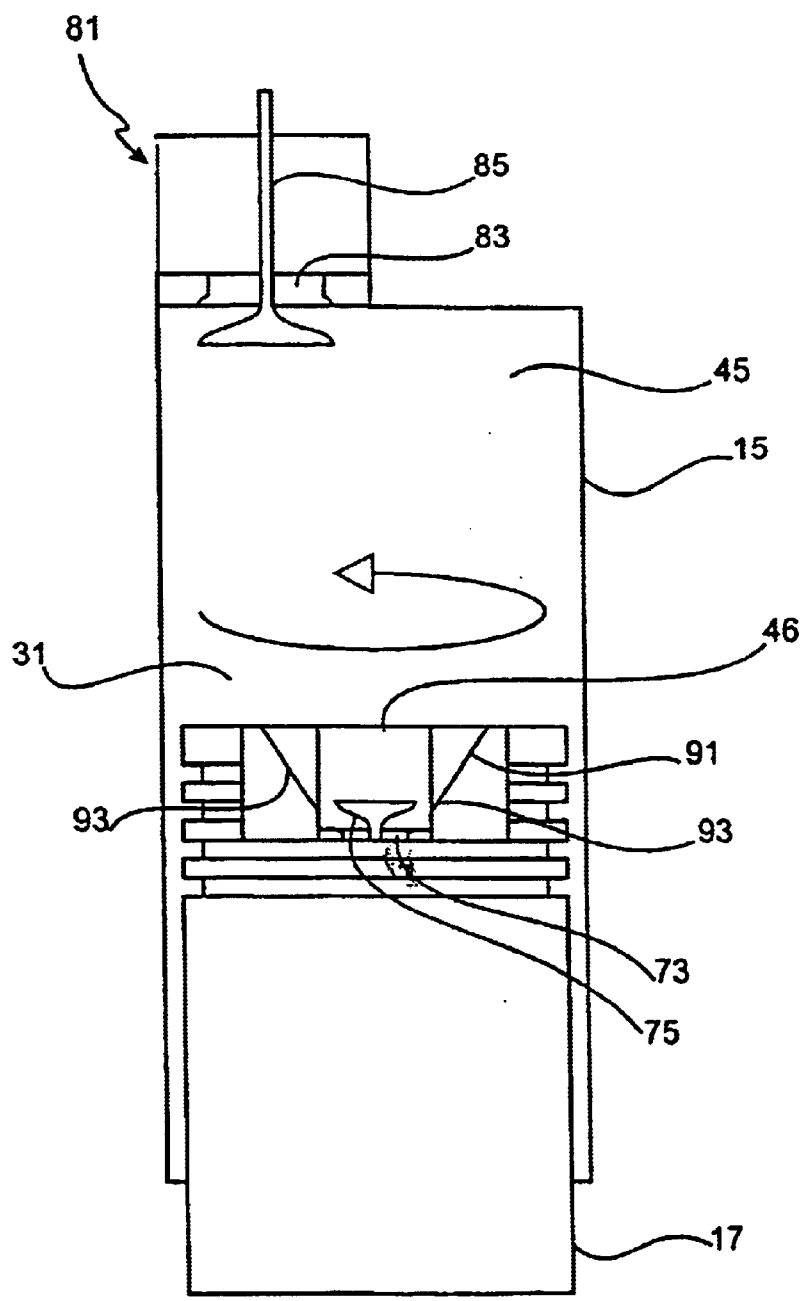
FIG. 7 is a schematic view of a combustion chamber defined by one of the cylinders and the piston reciprocating within that cylinder.
Figure 8:
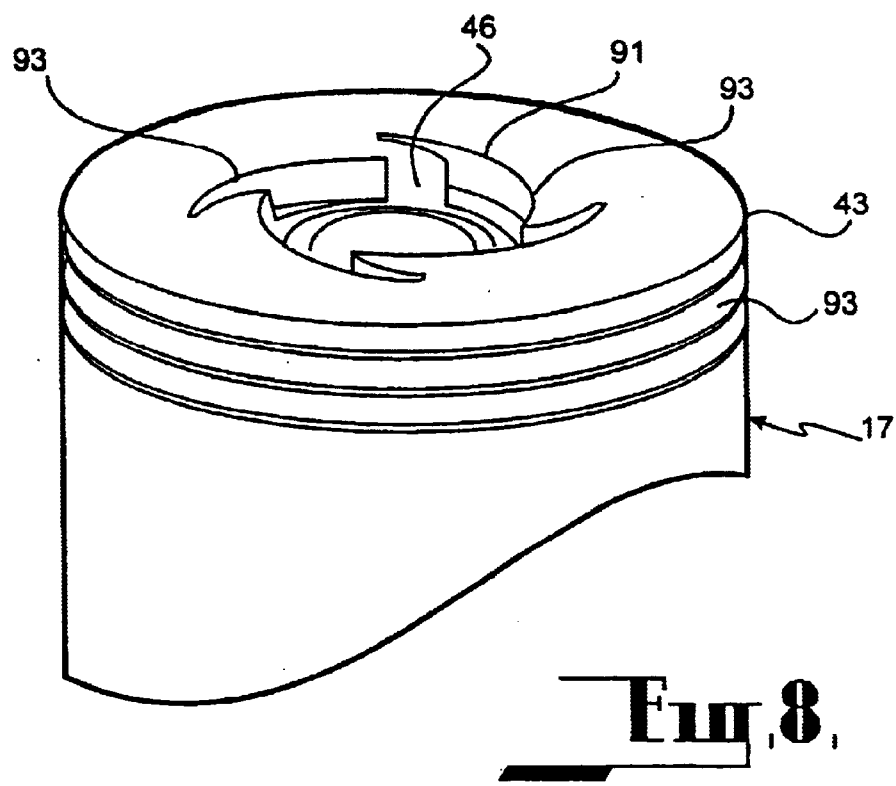
FIG. 8 is a schematic view of the head end of the piston.
Figure 9:
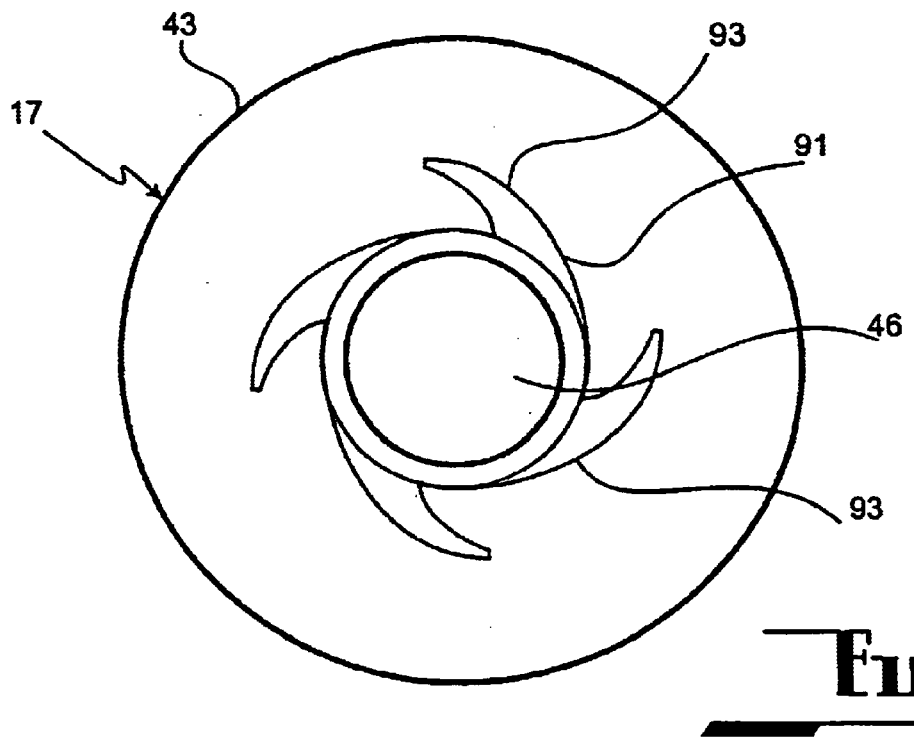
FIG. 9 is an end view of the piston shown in FIG. 8.
Figure 10:
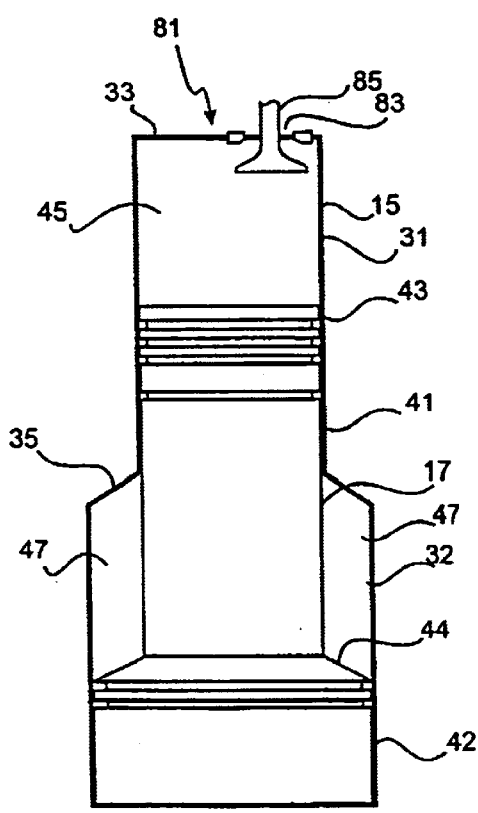
FIG. 10 is a schematic view of the piston in its cylinder.

As best seen in FIGS. 7, 8 and 9, a formation 91 is associated with the recess 46 for generating a turbulent motion in fluid within the recess and also in the combustion chamber 45. The formation 91 is in the form of a plurality of spiral grooves 93 formed in the head end 43 of the piston 17. Each spiral groove 93 extends outwardly from the recess and tapers inwardly (i.e. narrows) in the direction in which it spirals outwardly.

With this arrangement, the scavenging air passing through the transfer port 65 from the transfer chamber 63 to the combustion chamber 45 is influenced by the spiral grooves 93 so as to cause the scavenging air to undergo a turbulent motion. This turbulent motion assists in the scavenging process. Additionally, this turbulent motion subsequently assists in promoting mixing between the air and fuel droplets delivered into the combustion chamber to form the combustible mixture. Furthermore, the spiral grooves 93 generate a swirling motion in the combustible mixture within the combustion chamber during the compression process. This turbulent motion so generated further promotes mixing between the air and the fuel droplets.

Figure 11:
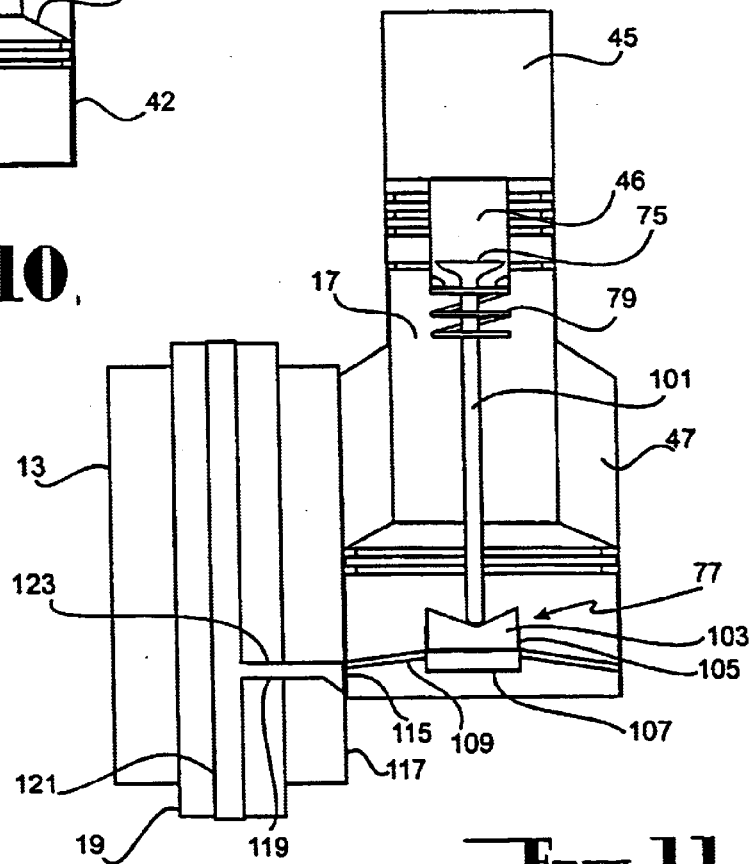
FIG. 11 is a schematic view of the piston showing a scavenging valve and control system therefore, the scavenging valve being shown in an open condition.
Figure 12:
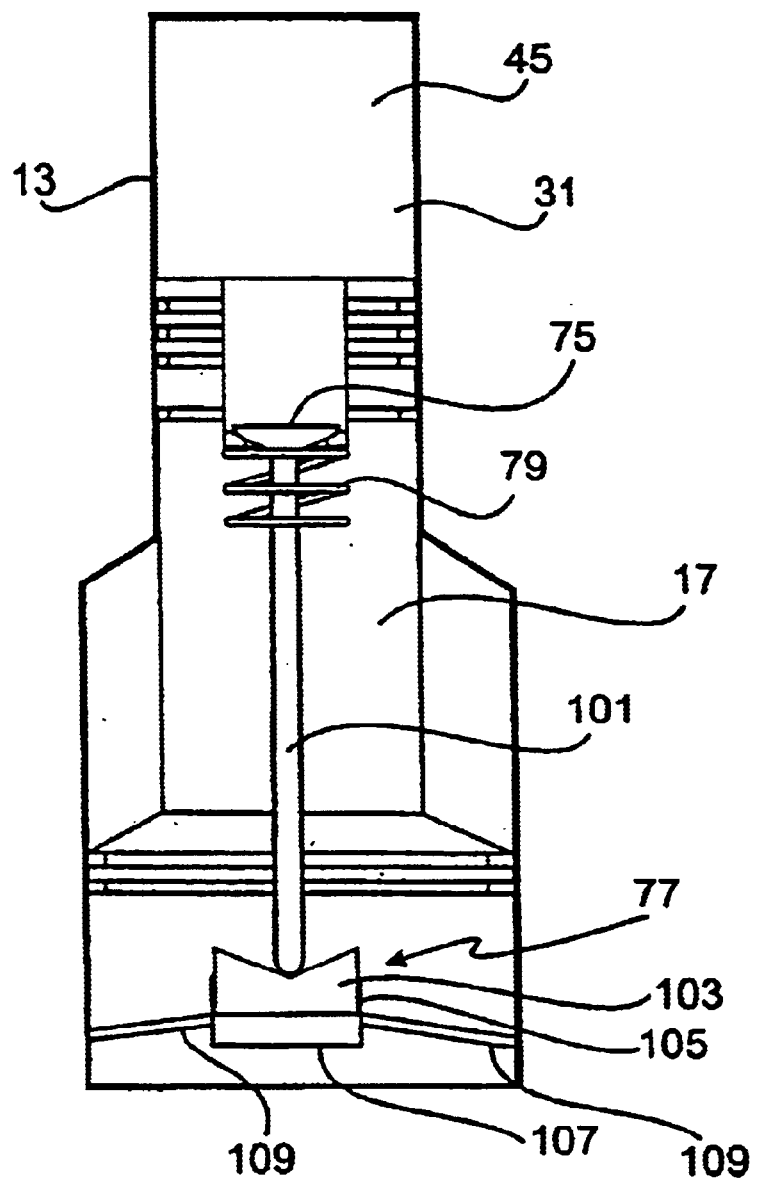
FIG. 12 is a view similar to FIG. 11 with the exception that the scavenging valve is shown in a closed condition.
Figure 13:
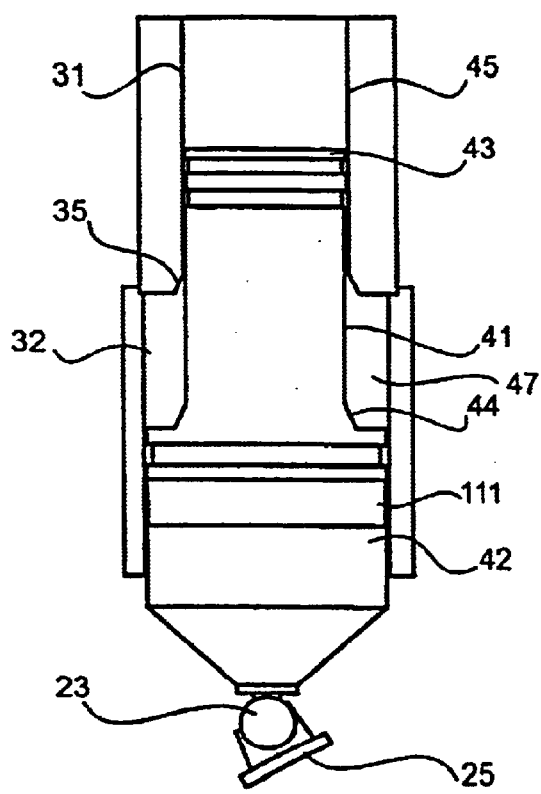
FIG. 13 is a further side view of the piston and cylinder, showing the piston in a condition in which a fluid flow path is established for hydraulic fluid operating a hydraulic lifter which controls operation of the scavenging valve.
Figure 14:
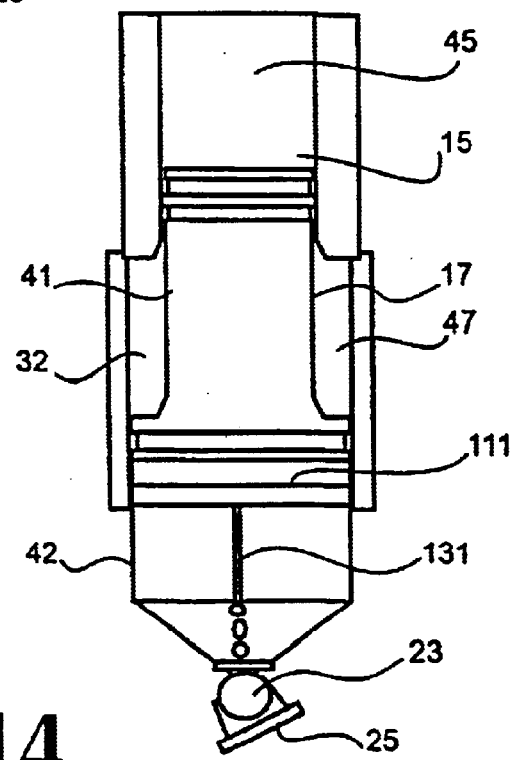
FIG. 14 is a view similar to FIG. 13 with the exception that the piston is in a condition in which the fluid flow path is closed.
Figure 15:
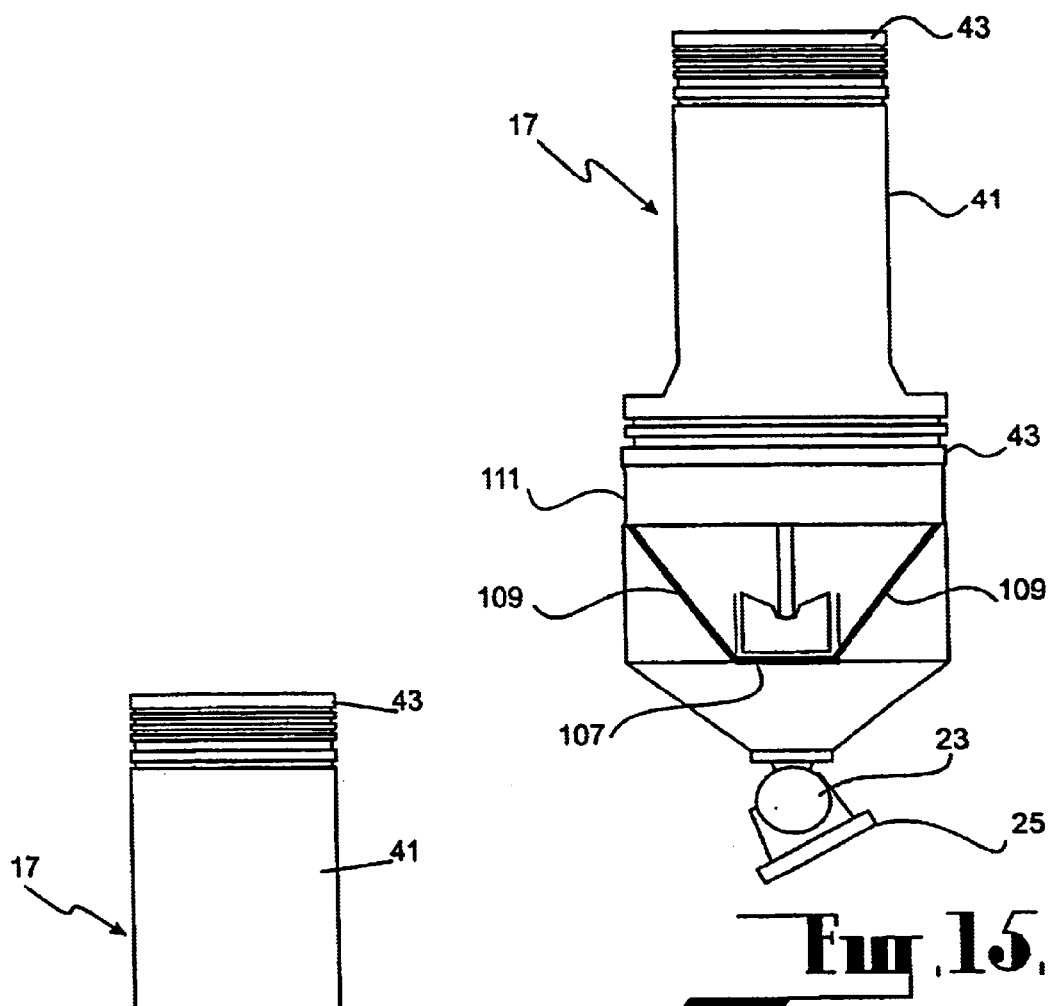
FIG. 15 is a schematic view of the piston showing part of the valve lifter and fluid flow path associated therewith.
Figure 16:
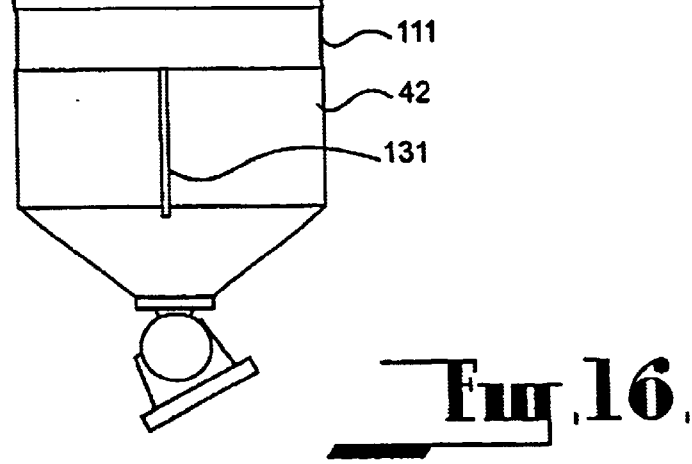
FIG. 16 is a schematic side view of the piston showing a bleed path for hydraulic fluid when the fluid flow path is closed.

As best seen in FIGS. 11 to 18, the hydraulic control system 77 for the discharge valve 75 comprises a push rod 101 one end of which is formed integrally with, or is connected to, the stem of the discharge valve 75, and the other end of which is connected to a control piston 103 received within a control cylinder 105. The control cylinder 105 is formed within the piston 17, as best seen in FIGS. 11 and 12 of the drawings. A control chamber 107 is defined between the control piston 103 and the control cylinder 105. The control chamber 107 is adapted to receive hydraulic fluid under pressure thereby to cause displacement of the control piston 103 and corresponding displacement of the push rod 101 which in turn moves the discharge valve 75 from the closed condition to the open position, as shown in FIG. 11.

Hydraulic fluid is delivered to the chamber 107 via a plurality of flow passages 109 defined by oil galleries formed in the piston 17. One end of each flow passage 109 communicates with the chamber 107 and the other end of each flow passage communicates with a circumferential recess 111 provided on the piston 17. The circumferential recess 111 is positioned on the outer surface of the piston pumping portion 43.

Figure 17:
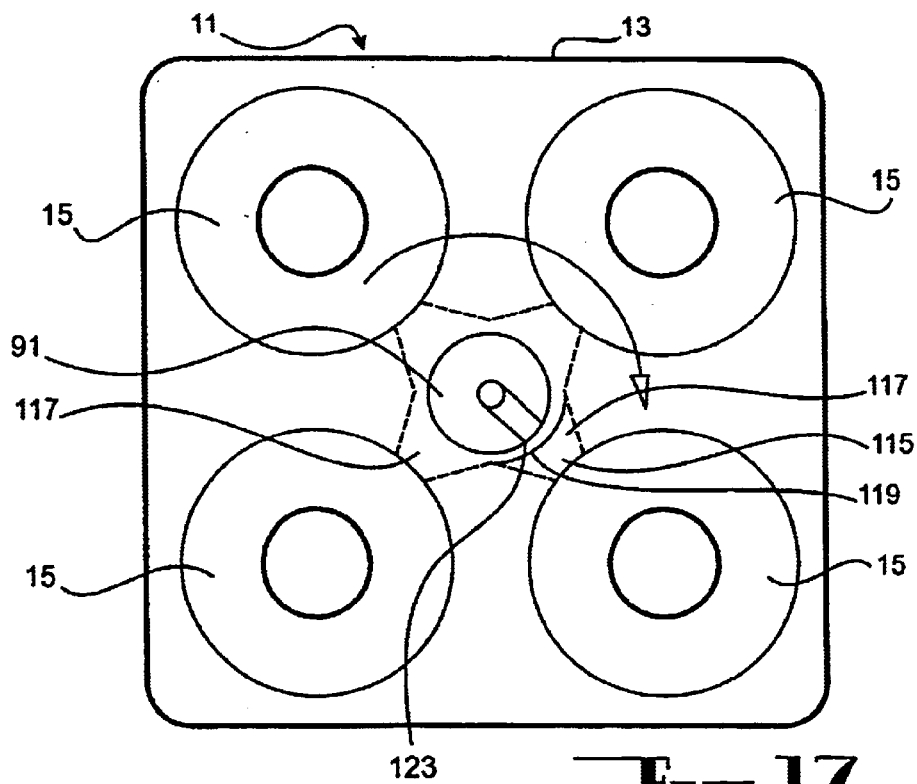
FIG. 17 is an end view of the engine showing the fluid flow path delivering hydraulic fluid to one cylinder of the engine.
Figure 18:
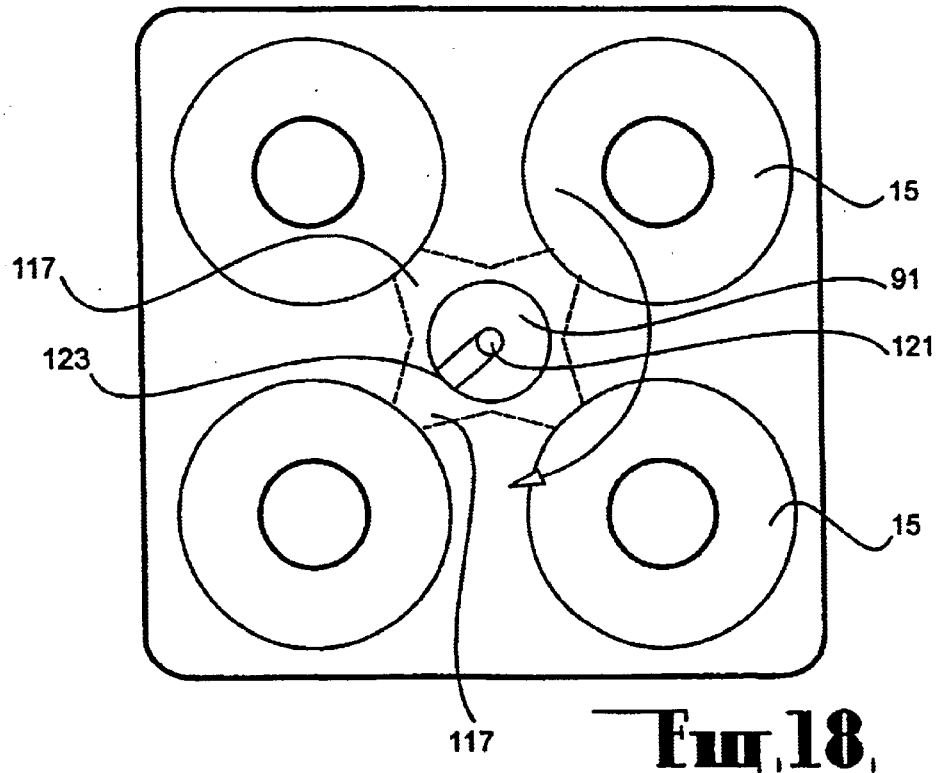
FIG. 18 is a view similar to FIG. 17 with the exception that the fluid flow path is shown delivering hydraulic fluid to another cylinder of the engine.

As the piston 17 reciprocates within the cylinder 15, the circumferential recess 111 sequentially moves into and out of registration with a respective oil delivery port 115 in the side wall of the cylinder 15. The port 115 communicates with a flow passage. 117 formed in the block 13. The flow passage 117 has an inlet region 119 which sequentially communicates with an oil delivery circuit 121 formed in the drive shaft 19 of the engine. The oil delivery circuit 121 includes an outlet port 123 which moves through a circular path with rotation of the drive shaft 19 and which sequentially communicates with the flow passages 117 associated with the four cylinders, as best seen in FIGS. 17 and 18 of the drawings. In this way, oil is sequentially delivered from the delivery circuit 121 in the drive shaft 19 to each of the cylinders 15. The inlet regions 119 of the passages 117 are wide so that there is minimal separation between adjacent passages 117 at the inlet regions 119 so as to allow smooth oil flow along the delivery circuit 121 and thereby avoiding shock loading on the oil delivery system.

As the recess 111 of each piston 18 moves into registration with its respective oil delivery port 115, it receives oil under pressure which causes actuation of the discharge valve 75 in the manner previously described. Once the recess 111 has moved out of registration with the delivery port, further oil flow is terminated. A bleed system 131 is provided to allow oil under pressure to bleed from the control chamber 107 so thereby allowing the discharge valve 75 to return to the closed condition under the influence of the spring 79. The oil bled from the bleed system can return to the sump 14 of the engine.

From the foregoing it is evident that the engine according to the embodiment has a simple, yet highly effective, arrangement, for operating the discharge valve 75 of each piston 17 in timed sequence.

It should be appreciated that the scope of the invention is not limited to the scope of the embodiment described. In particular, it should be appreciated that a piston having a recess incorporating a spiral formation to assist in creation of swirling motion within a combustion chamber can be employed in engines other than of the type described and illustrated in the present embodiment.

Throughout the specification, unless the context requires otherwise, the word "comprise" or variations such as "comprises" or "comprising", will be understood to imply the inclusion of a stated integer or group of integers but not the exclusion of any other integer or group of integers.

The claims defining the invention are as follows:

1. A piston for an internal combustion engine, of the type having a combustion chamber, the piston comprising a piston head, a recess formed in the piston head, a port communicating with the recess for delivery of a fluid into the combustion chamber, and a formation associated with the recess for generating turbulent motion in the fluid delivered into the combustion chamber from the port through the recess.

2. A piston according to claim 1 wherein the formation is configured to generate a swirling turbulent motion to the fluid.

3. A piston according to claim 1 wherein the formation comprises at least one spiral groove formed in the piston.

4. A piston according to claim 3 wherein there are a plurality of the spiral grooves disposed about the recess.

5. A piston according to claim 4 wherein each of the spiral grooves extends outwardly from the recess and tapers inwardly in the direction in which it spirals outwardly.

6. A piston according to claim 1, wherein the formation is arranged and configured to impart a swirling motion to scavenging air entering the combustion chamber through the port so as to assist the scavenging process.

7. A piston according to claim 1, wherein the recess has a base and the port is located at the base of the recess.

8. A piston according to claim 6 wherein the port is opened and closed by a valve operable under the influence of a control system.

9. A piston according to claim 8 wherein the control system comprises a hydraulic lifter operable by a hydraulic fluid.

10. A piston according to claim 9 wherein the control system further comprises a fluid flow path along which hydraulic fluid is delivered to the hydraulic lifter, the fluid flow path including a first section and a second section.

11. A piston according to claim 10 wherein the second section is located in the piston and opens onto a side wall thereof.

12. A piston according to claim 11 wherein the first section is located in part of the engine with respect to which the piston can reciprocate, and opens onto a side wall of the cylinder in which the piston is housed.

13. A piston according to claim 10 wherein a bleed path is associated with the second section to allow hydraulic fluid to bleed therefrom.

14. A piston according to claim 8 wherein the control system further comprises a spring means for biasing the valve to a closed condition in relation to the port.

15. A piston for an internal combustion engine of the type having a combustion chamber, the piston comprising: a port formed in the head thereof through which a fluid can be delivered into the combustion chamber; a valve for opening and closing the port; and a formation in the piston head for imparting a swirling motion to fluid delivered into the combustion chamber through the port upon opening thereof.

16. A piston according to claim 15 wherein the port is accommodated in a recess formed in the piston, the formation comprising a plurality of spiral grooves formed in the piston about the recess.

17. A piston according to claim 15 wherein the port is opened and closed by a valve operable under the influence of a control system.

18. A piston according to claim 17 wherein the control system comprises a hydraulic lifter operable by a hydraulic fluid.

19. A piston according to claim 18 wherein the control system further comprises a fluid flow path along which hydraulic fluid is delivered to the hydraulic lifter, the fluid flow path including a first section and a second section.

20. A piston according to claim 19 wherein the second section is located in the piston and opens onto a side wall thereof.

21. A piston according to claim 20 wherein the first section is located in part of the engine with respect to which the piston can reciprocate, and opens onto a side wall of the cylinder in which the piston is housed.

22. A piston according to claim 19 wherein a bleed path is associated with the second section to allow hydraulic fluid to bleed therefrom.

23. A piston according to claim 18 wherein the control system further comprises a spring means for biasing the valve to a closed condition relation to the port.

24. A piston for an internal combustion engine, the piston comprising: a port formed in the head thereof through which a fluid can be delivered into a combustion chamber; a valve for opening and closing the port; and a control system for operating the valve, the control system including a hydraulic lifter operable by a hydraulic fluid, the control system further including a fluid flow path along which hydraulic fluid is delivered to the hydraulic lifter, the fluid flow path having a first section and a second section, the second section being located in the piston and opening onto a side wall thereof, and the first section being located in part of the engine with respect to which the piston can reciprocate and opening onto a side wall of the cylinder in which the piston is housed, whereby the second section can register with the first section for a limited period during reciprocation of the piston such that when the piston is performing a prescribed stroke and there is registration between the two sections of the fluid flow path, hydraulic fluid can flow from the first section to the second section thereby to cause operation of the valve lifter.

\* \* \* \* \*